United States Patent
Dockser

[11] Patent Number: 5,604,689
[45] Date of Patent: Feb. 18, 1997

[54] ARITHMETIC LOGIC UNIT WITH ZERO-RESULT PREDICTION

[75] Inventor: Kenneth A. Dockser, San Jose, Calif.

[73] Assignee: VLSI Technology, Inc., San Jose, Calif.

[21] Appl. No.: 653,010

[22] Filed: May 24, 1996

Related U.S. Application Data

[62] Division of Ser. No. 315,465, Sep. 30, 1994.

[51] Int. Cl.$^6$ .................................................. G06F 7/00
[52] U.S. Cl. .................. 364/715.01; 364/715.09; 364/736.5
[58] Field of Search ................ 364/715.01, 715.09, 364/736.5, 768

[56] References Cited

U.S. PATENT DOCUMENTS

| | | | |
|---|---|---|---|
| 3,983,382 | 9/1976 | Weinberger | 364/736.5 |
| 4,630,192 | 12/1986 | Wassel et al. | 364/715.09 |
| 4,924,422 | 5/1990 | Vassiliadis et al. | 364/715.09 |
| 5,091,874 | 2/1992 | Watanabe et al. | 364/715.1 |
| 5,367,477 | 11/1994 | Hinds et al. | 364/736.5 |

*Primary Examiner*—Tan V. Mai
*Attorney, Agent, or Firm*—Clifton L. Anderson

[57] ABSTRACT

An arithmetic logic unit provides for zero-result prediction so as to eliminate the latency between successive operations (e.g., multiplication and division) when a zero detection is a condition for performance of the second operation. Instead of performing zero detection on the result, zero prediction is performed on the initial or intermediate operands, (e.g., partial products that are summed to generate a product). To this end, zero-prediction logic determines whether or not both of the following conditions are met: 1) either the least significant bits of the addends are the same and the carry-in is zero or the least significant bits of the addends are different and the carry-in is one. 2) for each pair of adjacent bit positions, the four included bits are consistent with addend complementarity. If both conditions are met, a zero result is predicted; otherwise, a non-zero result is predicted.

5 Claims, 3 Drawing Sheets

ARITHMETIC LOGIC UNIT WITH ZERO-RESULT PREDICTION

This application is a division of application Ser. No. 08/315,465, filed Sep. 30, 1994, pending.

BACKGROUND OF THE INVENTION

The present invention relates to computers and, more particularly, to arithmetic logic units for computers. A major objective of the present invention is to provide for faster zero-sum determinations.

Much of modern progress is associated with advances in computer performance. Recent computers typically use one or more microprocessors to execute desired operations. Each microprocessor design is characterized by the set of instructions it can recognize and execute. The instruction sets of early microprocessors included a relatively small number of simple instructions. Accordingly, many instructions could be required to implement even simple operations such as addition and multiplication. Succeeding generations of microprocessors accommodated more instructions and more complex instructions, thus reducing program length as well as programming time.

To provide for synchronous operation, instructions progress according to fixed-period instruction cycles. Simple instructions can be performed in a single instruction cycle, while more complex instructions may require multiple instruction cycles. Most instructions can be completed before the end of a cycle; the remainder of the cycle is, in a sense, wasted.

This wasted cycle time can be minimized at the microprocessor design stage by selecting a short instruction cycle. However, a shorter instruction cycle increases the number of instructions that must be performed in multiple cycles. There is overhead involved in managing multi-cycle instructions. This overhead, in addition to that associated generally with larger instruction sets, results in increased microprocessor complexity and size. The weight of industry opinion is that these increases in size and complexity more than offset the advantages of adding more multi-cycle instructions to the instructions sets of microprocessors.

Increasingly, processors are designed as "reduced instruction-set computers" (RISC). In the RISC approach, a relatively small set of, preferably single-cycle, instructions is used. This approach takes better advantage of integrated circuit real estate and generally improves processor throughput. A disadvantage is the number of instructions required to implement an operation is increased. However, compilers have been developed that can generate suitable instructions from a high-level programming language. This relieves the programmer of the burden of generating the long program code required by the small instruction set.

Preferably, all or most instructions are executed within a single instruction cycle. This minimizes the circuitry required to manage instructions of varying length. A disadvantage is that the instruction cycle must be matched to the longest single-cycle instructions. Instructions that could be executed in less time still consume an entire cycle. Overall processor throughput is thus closely tied to time required to perform the longest single-cycle instruction.

In some cases, a microprocessor architect can choose between executing an operation using a single instruction to save cycles or in multiple-instructions so that a shorter instruction cycle can be used. An important example is a multiplication coupled with a zero detection of the product. There are many cases where a program branches in the event of a zero detection. For example, where a product of a multiplication is to be used as a divisor in a subsequent division, e.g., $a=b/(c \cdot d)$, zero detection of the product can be used to avoid a division by zero.

Because of the frequency of its use, multiplication plus zero detection can define a useful single instruction. Multiplication is a relatively long instruction, but zero detection can be achieved in a relatively short time. For example, the bits of a number can be NORed together so that a high output indicates a zero product while a low output indicates a non-zero product. Even though the additional time required for the zero detection is short, it can have a large impact on throughput if the instruction cycle is lengthened to permit its execution within a single multiplication cycle. In that case, the time required for zero detection is added to all instructions whether or not they involve a zero detection.

The alternative is to perform the multiplication and the zero detection as separate instructions. However, this is wasteful because entire cycles must be devoted to the zero detections, which should only consume a fraction of a cycle. What is needed is an approach that avoids the tradeoffs between the one cycle and the two cycle implementations of multiplication with zero detection.

SUMMARY OF THE INVENTION

In accordance with the present invention, an arithmetic logic unit provides for prediction of a zero result of an operation no later than the result is determined. To this end, zero prediction logic is coupled to the operands rather than to the result.

The simplest example is for subtraction. The present invention provides for logic comparing a subtrahend and a minuend on a bit-by-bit basis. If all bits are identical, the difference is zero. This determination can be provided by a series of exclusive NOR (XNOR) gates (same=1, different= 0), logically multiplied (ANDed) over all bits (in which case a "1" implies a zero difference). (If "0" is to indicate a zero difference, a NAND gate can be used instead of the AND gate). The XNOR operations can be performed in parallel, in contrast to the difference which is achieved serially. Accordingly, the zero determination can anticipate the actual determination of the difference.

Zero predication can also be achieved for addition, although the logic is more complex. As a first step in identifying the proper logic, the general pattern of complementary binary numbers can be recognized. As in subtraction, two addends can be examined on a bit-by-bit basis.

Herein, two types of complementarity are recognized. If the sum of two binary numbers is zero, they are two's complements. The sum of a pair of one's complements and a carry-in of one equals zero. One's complements are easily recognized because they differ at every bit position. The patterns of two's complements can be determined as follows.

In general, the bit positions of a pair of two's complements can be divided into three sections of consecutive bits. A "double-zero" section of consecutive least significant bits includes bit positions in which both numbers have zeroes. A "double-one" section includes a single-bit position in which both addends have a one. An "inverse" section of consecutive most significant bits includes bit positions in which the values are different. In special cases, either the inverse section or the double-zero section can be absent; in such cases, the double-one section is at an extreme (least or most)

significant bit position. In the special case of two addends equal to zero, only zeroes are present: both the inverse group and the double-one group are omitted. Extending this conceptualization to a pair of one's complements, the inverse section consumes the entire bit length of the pair.

The foregoing characterization imposes constraints on the subpatterns (e.g., "quads") that can characterize any pair of adjacent bit positions for the addends. For example, if the values at a first bit position are 0,0, the values at the next more significant bit position must be 0,0 or 1,1; the values cannot be different (0,1 or 1,0). If the values at a bit position are 1,1, the values at the next most significant bit position must differ. If the values at a bit position are different, the values at the next more significant bit position must also be different.

If these conditions of complementarity are met at every bit position, if there is no carry-in or a zero carry-in, and if the least significant bits are the same, the sum is zero. If these conditions of complementarity are met at every bit position, if there is a carry-in equal to one, and if the least significant bits are different, the sum is zero. Otherwise, the sum is non-zero.

Suitable zero sum detection logic for n-bit addends can include an n-input AND gate (assuming a "1" is used to flag the zero detection, otherwise a NAND gate can be used). Note that for addends of different bit lengths, the bit lengths can be equalized by adding zeroes as the most significant bits of the shorter number. Each AND input is coupled to the output of a respective two-input exclusive OR (XOR) gate. One input of each XOR input is coupled to an OR gate, the other is coupled to an XNOR gate. The XNOR gate inputs are coupled to the respective bit positions of the two addends. The OR gate inputs are coupled to the bit positions of the previous most significant bit positions of the two addends. This logic can make the zero determination faster than an adder can determine the actual sum.

The AND gate inputs can be multiplexed to provide for both addition and subtraction modes. In subtraction mode, the multiplexer can couple the AND gate inputs directly to the XNOR gate outputs. In addition mode, the multiplexer can couple the AND gate inputs to the XOR gate outputs. Further economizing can be achieved by sharing common components with the main arithmetic logical components.

As discussed in the background section, zero product determination is of particular interest since multiplication is likely place a lower bound on a RISC instruction cycle. The product of a multiplication is generally obtained as the sum of partial products or a product term and a carry term. The previously described zero sum prediction logic can be applied to the partial products to predict zero products. Similarly, zero quotients can be predicted.

The present invention thus eliminates the latency of zero detection following arithmetic operations. Thus, the microprocessor architect need not be faced with a conflict between a separate zero detection cycle and a longer multiplication cycle. Instruction cycle time can be minimized without requiring separate zero detection instructions. This simplifies program code and improves execution throughput. These and other features and advantages of the present invention are apparent from the description below with reference to the following drawings.

DESCRIPTION OF THE PREFERRED EMBODIMENTS

Figure 1:
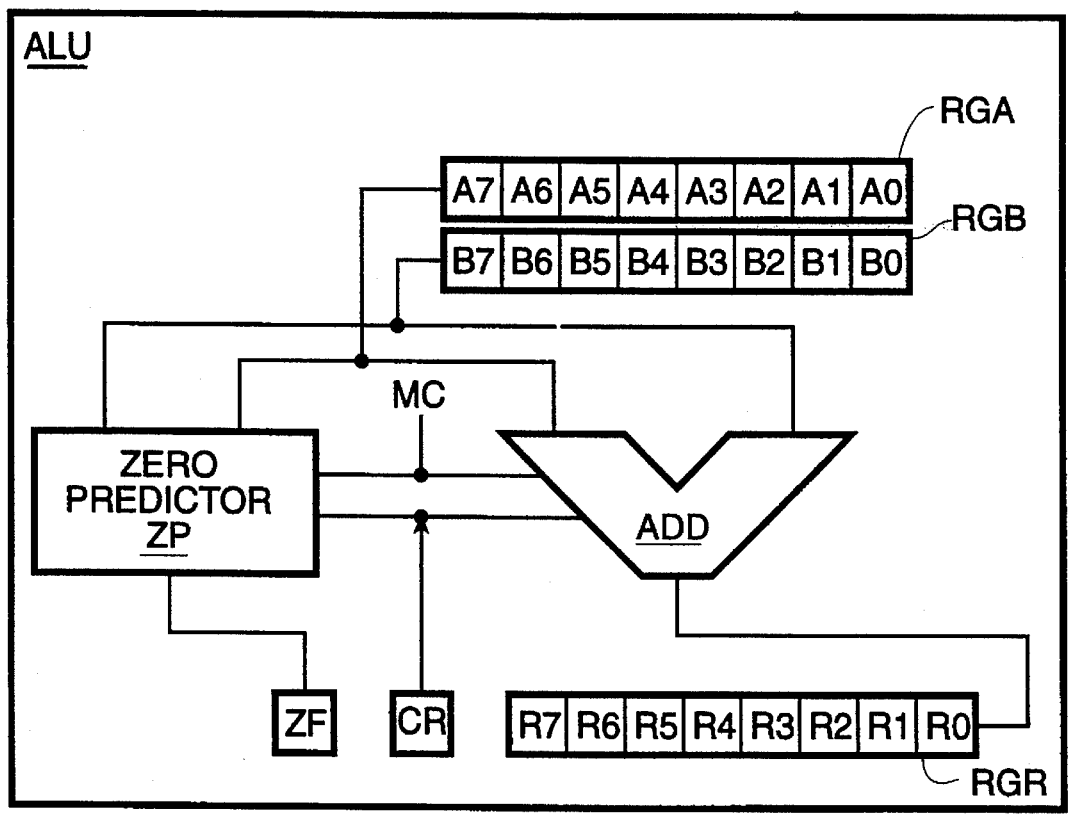
FIG. 1 is a schematic diagram of an arithmetic logic unit incorporating a zero predictor in accordance with the present invention.

In accordance with the present invention, an arithmetic logic unit ALU comprises an adder ADD, a zero-predictor ZP, operand registers RGA and RGB, a result register RGR, a zero-flag register ZF, and a carry-in register CR, as shown in FIG. 1. Arithmetic logic unit ALU also comprises unillustrated components that permit multiplication and division to be performed, using registers RGA and RGB for partial products and quotients.

Both adder ADD and zero predictor ZP have their inputs coupled to outputs of operand registers RGA and RGB. Adder ADD has its output coupled to result register RGR for storing the result of an operation therein. Zero predictor ZP has its output coupled to zero-flag register ZF for storing a "1" when a zero result is predicted and a "0" when a non-zero result is predicted.

Zero predictor ZP has its input coupled to operand registers RGA and RGB so that a zero result can be predicted before the result of the addition or subtraction performed by adder ADD is obtained. This contrasts with prior art designs which include a zero-detector which has the ALU output as its input. The present invention does not require that in all cases the result register be physically distinguished from the operand registers, but does require that the inputs are operands rather than the result for which equivalence to zero is to be predicted.

Both adder ADD and zero predictor ZP have addition and subtraction modes that are alternatively selected by mode control line MC. In addition mode, adder ADD sums the addends in registers RGA and RGB. Optionally, for example in response to an "add plus carry" instructions, adder ADD sums the addends with the carry-in value stored in register CR. In subtraction mode, the value stored in RGB is subtracted from the value stored in RGA; the carry-in is ignored in subtraction mode. Zero predictor ZP predicts a zero sum in addition mode and a zero difference in subtraction mode.

Zero flag register ZF and carry-in register CR are 1-bit registers; alternatively, they can be a single bits of a multi-bit special purpose register. For expository purposes, the remaining illustrated registers are shown as 8-bits each. Register RGA includes bit positions A0–A7, register RGB includes bit positions B0–B7, and register RGR includes bit positions R0–R7. In practice, modern microprocessors provide for significantly greater numbers of bits.

In subtraction mode, zero predictor ZP compares the operands at each bit position. If the two operands are equal at every bit position (i.e., if the operands are themselves equal), a zero difference is predicted. Otherwise, a non-zero difference is predicted.

In addition mode, zero-predictor ZP determines whether or not the sum of the addends and the carry-in CR is zero. When the carry-in is one, zero-predictor ZP determines whether or not the addends are one's complements. When the carry-in is zero, zero-predictor ZP determines whether or not the addends are two's complements. The determinations are made by examining the "quads" that constitute the pair of addends and the carry-in.

Herein, a "quad" is a 2×2 matrix of the values of the two addends for two consecutive bit positions. There are seven "proper" quads for registers RGA and RGB ranging from $$\begin{matrix} A1 & A0 \\ B1 & B0 \end{matrix} \text{ to } \begin{matrix} A7 & A6 \\ B7 & B6 \end{matrix}.$$

To accommodate the carry bit, an eighth quad is considerate:

$$\begin{matrix} A0 & ZB \\ B0 & CR \end{matrix}$$

where CR is the carry bit and ZB is a "zero bit" which is always zero. Each quad includes a more significant pair of values, e.g., A7, B7, and a less significant pair of values, e.g., A6, B6. Each such pair can include a pair of 1s, a pair of 0s, or a pair of inverse values, e.g., 0,1 or 1,0.

Figure 2:
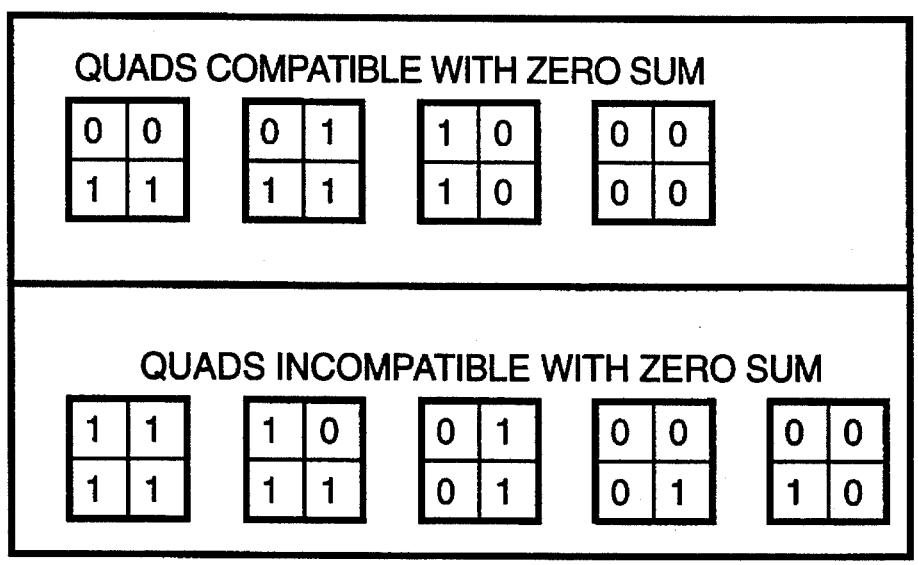
FIG. 2 is a table of permissible and impermissible subpatterns for complementary numbers.

FIG. 2 is a table distinguishing quads that are compatible with complementarity (and therefore a zero sum) and those that are incompatible. There are four compatible quads and five incompatible quads. FIG. 2 does not distinguish between the two types of inverses, i.e., 0,1 and 1,0. Taking this distinction into account would yield eight compatible quads and eight incompatible quads.

If any of the eight quads for two 8-bit addends is incompatible with complementarity, a non-zero sum is predicted. If all eight quads are compatible, a zero sum is predicted. An alternative conceptualization explicitly distinguishes the cases where the carry-in is one and the carry-in is zero and considers only the seven proper quads: 1) if the carry is zero, if the least significant bits (A0, B0) are equal, and if all seven proper quads are compatible, then a zero result is predicted; 2) if the carry is one, if the least significant bits are different, and if all seven proper quads are compatible, then a zero result is predicted; 3) otherwise, a non-zero result is predicted.

Figure 3A:
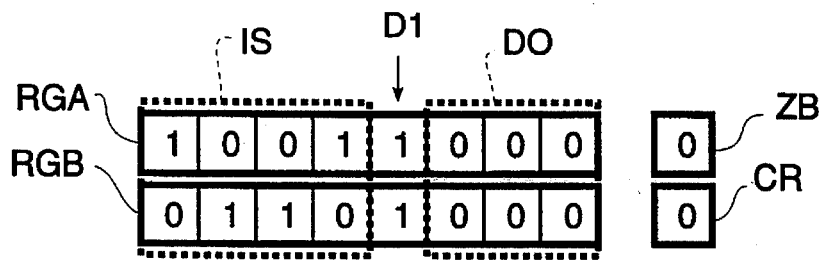
FIG. 3A represents a pair of complementary binary numbers having a sum equal to zero.

The distinction between compatible and incompatible quads follows from the study of the patterns of complementary addends. A general pattern for two's-complementary addends is shown in FIG. 3A. The pair of addends is divided into three sections, an inverse section IS, a double-one section D1, and a double-zero section D0. In the double-zero section D0, the addends both have zeroes. In the double-one section, the addends both have ones. In the inverse section, the addends have different values. In the case illustrated in FIG. 3A, inverse section IS is four bits long, double-one section D1 is one-bit long, and double-zero section is three bits long.

For the sum of a pair of two's complements to be zero, the carry-in CR must be zero as shown. The zero bit ZB, added to explain the "quad-detection" logic of zero predictor ZP works, is fixed at zero.

Figure 3B:
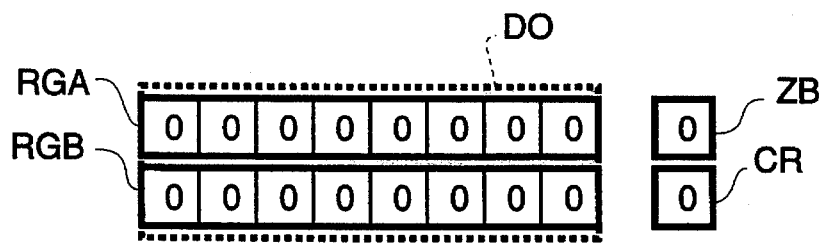
FIG. 3B represents a pair of complementary numbers for the special case where both numbers are zero.

FIG. 3B illustrates the special case in which both addends are zero and therefore have zeroes at all bit positions. In this case, the double-zero section is eight bits long; the double-one section and the complementary section are absent. Carry-in CR is zero as required for a zero sum.

Figure 3C:
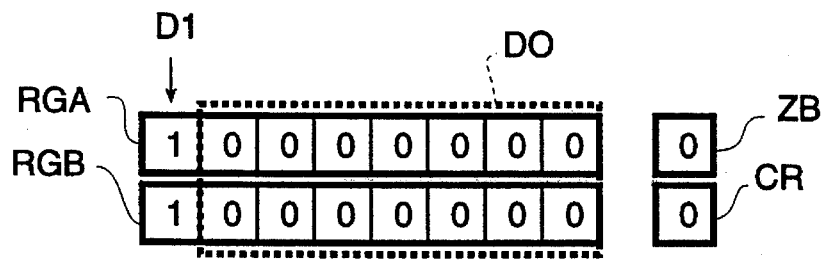
FIG. 3C represents a pair of complementary numbers for the special case both numbers are $2^n$ (or $-2^{n-1}$ for two's complement signed numbers)

FIG. 3C illustrates the special case in which both addends take the form of a one followed only by zeroes. In this case, the double-one section is one-bit long and the double-zero section consumes the remaining bit positions. The inverse section is absent. Carry-in CR is zero as required for a zero sum.

Figure 3D:
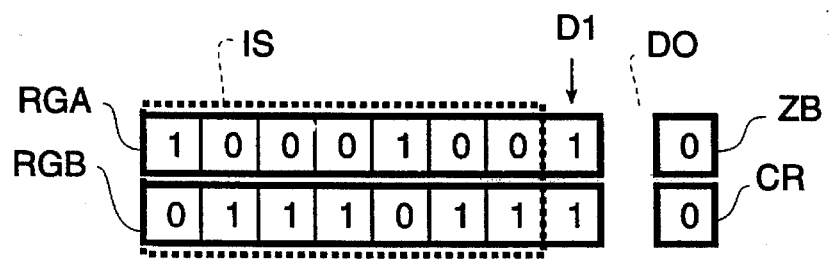
FIG. 3D represents a pair of complementary numbers for a case in which both numbers have "1" at their least significant bits.

FIG. 3D represents the cases in which both addends have ones as their least significant bits. They differ at all other bit positions. Thus, the double-one section is one-bit long, while the inverse section consumes the remaining bit positions. The double-zero section is absent. Carry-in CR is zero as required for a zero sum.

Figure 3E:
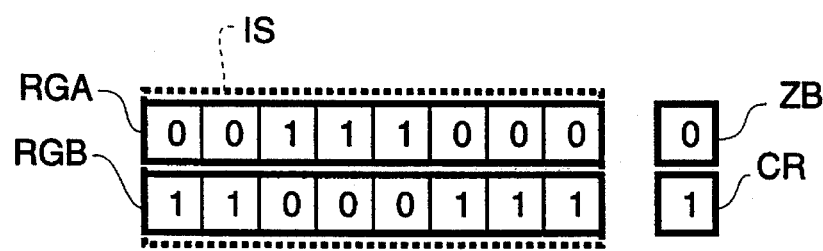
FIG. 3E represents a case where a zero sum is predicted when a carry-in is equal to one.

FIG. 3E illustrates the case where the addends are one's complements and carry-in CR is one. As in the cases of FIGS. 3A–3D, the zero bit is set to zero.

Figure 4:
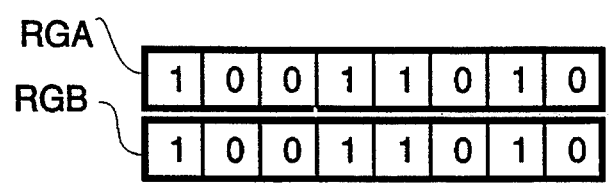
FIG. 4 represents a pair of equal numbers having a difference equal to zero.

FIG. 4 represents the general case of equal operands for which a zero difference is generated in subtraction mode.

Generalizing from the examples of FIG. 3A–D, the following four criteria can be formulated for two's complementarity:

1) To be two's complementary, two addends must collectively include either double-zeroes at all bit positions or exactly one double-one pair.

2) To be two's complementary, two addends including a double-one pair at a bit position that is not the least significant bit position must include double zeroes at all less significant bit positions.

3) To be two's complementary, two addends including a double-one pair at a bit position that is not the most significant bit position must include inverse pairs at all more significant bit positions.

4) To be two's complementary, two addends cannot include an inverse pair adjacent to a double-zero pair. (This criterion follows from the first three.)

A pair of addends is two's complementary if all four criteria are met. The pair of addends is not two's complementary if at least one of the four criteria is not met.

It should be noted that any pair of addends including one of the quads listed as incompatible in FIG. 2 violates at least one of these three rules. Quad $$\begin{matrix} 1 & 1 \\ 1 & 1 \end{matrix}$$

violates the first criterion, which excludes two double-one pairs. Quad $$\begin{matrix} 1 & 0 \\ 1 & 1 \end{matrix}$$

violates the second criterion which requires that the next least significant pair relative to a double-one pair be a double-one zero pair. Quad $$\begin{matrix} 0 & 1 \\ 0 & 1 \end{matrix}$$

violates the third criterion which requires that the next more significant pair relative to a double-one pair be an inverse pair. The remaining two incompatible quads violate the fourth criterion.

None of the incompatible quads is represented in FIGS. 3A–D. On the other hand, the compatible quads are all represented in FIG. 3A. In the one's complement case of FIG. 3E, all quads are of the

```
0  0
1  1
``` compatible type. Thus, a zero sum is predicted if and only if all eight quads are compatible.

Figure 5:
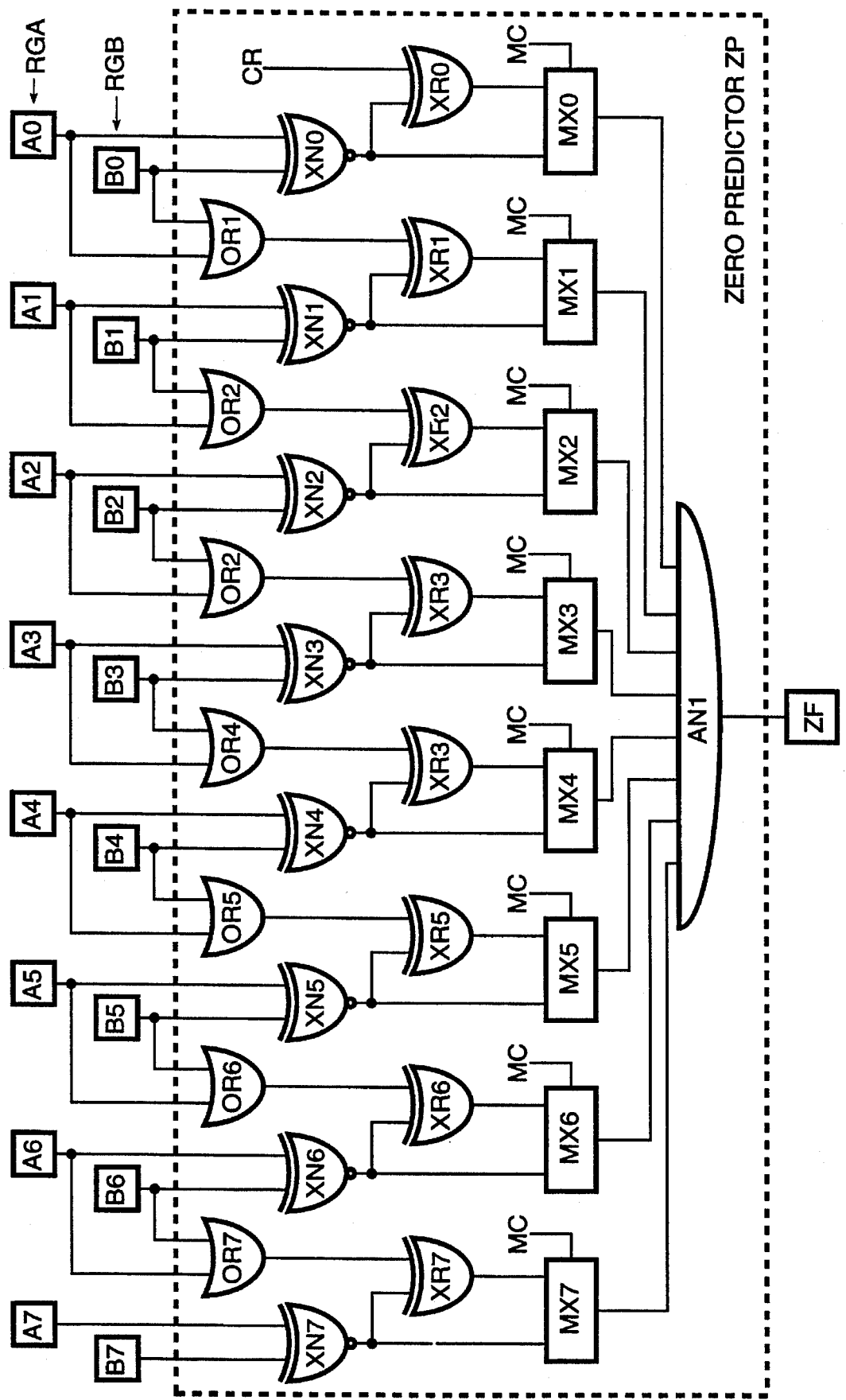
FIG. 5 is a logic diagram of the zero predictor of FIG. 1.

Accordingly, zero-predictor ZP is designed to test whether the quads are all compatible with complementarity. Zero-predictor ZP includes OR gates OR1–OR7, XNOR gates XN0–XN7, XOR gates XR0–XR7, multiplexers MX0–MX7, and an AND gate AN1, configured as shown in FIG. 5.

The output of gate AN1 is stored in zero-flag register ZF. A one indicates a zero prediction, while a zero indicates a non-zero prediction. Accordingly, a zero is predicted if and only if all inputs to gate AN1 are high. The inputs to gate AN1 are the outputs of multiplexers MX0–MX7. The multiplexers are controlled by mode control signal MC to select between addition mode and subtraction mode. In addition mode, the multiplexers couple the outputs of XOR gates XR0–XR7 to gate AN1; in subtraction mode, the multiplexers couple the outputs of XNOR gates XN0–XN7 to gate AN1.

Thus, in addition mode a zero sum is predicted when all the outputs of XOR gates XR0–XR7 are high (=one). The inputs to XOR gate XR0 are carry signal CR and the output of XNOR gate XN0. The inputs to XNOR gate XN0 are coupled to least significant bits A0 of register RGA and B0 of register RGB. Thus, XNOR gate XN0 outputs a high when A0=B0 and a low when A0≠B0. If carry-in CR is low, A0=B0 yields a high output from gate XR0; if carry-in CR is high, A0≠B0 yields a high output from gate XR0. Otherwise, the output from gate XR0 is low and a non-zero sum is predicted.

A high output from XOR gate XR1 indicates that the least significant quad is compatible with complementarity. The inputs to XOR gate XR1 are XNOR gate XN1 and OR gate OR1. The inputs to XNOR gate XN1 are bits A1 and B1 so its output is high if they are the same. The inputs to OR gate OR1 are A0 and B0 so its output is high if either of them is high. Thus, if either A0 or B0 is high and A1 and B1 are the same, a non-zero prediction is made. If both A0 and B0 are low and A1 and B1 are different, a non-zero prediction is made. For complementarity, A1 and B1 must be the same if both A0 and B0 are low; if either A0 or B0 is high A1 and B1 must be different.

The roles of the remaining XOR, XNOR, and OR gates, are analogous to gates XR1, XN1, and OR1. In addition mode, if XOR gate XR0 indicates that the least'significant bits are the same with carry-in CR=0 (or different with a carry-in CR=1) and XOR gates XR1–XR7 indicate all quads are compatible with complementarity, a zero prediction is made. Otherwise, a non-zero prediction is made.

In subtraction mode, multiplexers MX0–MX7 couple the inputs of gate AN1 to the outputs of XNOR gates XN0–XN7 that test for equality at each of the bit positions for registers RGA and RGB. Equality at all bit positions implies equality of the operands, which implies a zero difference. Inequality at any bit position implies a non-zero difference prediction.

While quad examination is a particularly efficient approach to identifying complementary addends, larger units can be examined to achieve the same result. Furthermore, the present invention provides for zero prediction using procedures that are not so piecemeal. For example, one could detect double ones. If there are more than one, a non-zero prediction is made. If there are no double ones, one can check if both addends are zero with a carry in of zero or the logical inverse of each other with a carry-in of one, in which case a zero prediction can be made; otherwise, the prediction is non-zero. If there is exactly one double one, one can examine the more significant bit positions to ensure that they are all complementary and the less significant bit positions to ensure that they are all double zeroes and the carry-in to ensure that it is zero, in which case a zero prediction is made. Otherwise, the prediction is non-zero.

Unoptimal schemes can be employed in the ALU of FIG. 1 provided that the zero-prediction is completed no later than the actual computation of the result. These and other modifications to and variations upon the preferred embodiments are provided for by the present invention, the scope of which is limited only by the following claims.

What is claimed is:

1. A zero-sum predictor comprising:

register means for storing first and second binary addends;

logic means for determining whether or not the following conditions are met
   a) for each pair of adjacent bit positions, the four included bits are consistent with complementarity,
   b) the least significant bits of the operands are the same.

2. A zero-sum predictor as recited in claim 1 wherein:

said register means also stores a carry-in;

said logic means predicting
   a zero result when the carry-in is zero and conditions a and b are met,
   a zero result when the carry-in is one, condition a is met and condition b is not met, and
   a non-zero result otherwise.

3. A zero-sum predictor comprising:

register means for storing first and second binary addends and a binary carry-in;

logic means for determining whether or not the following conditions are met
   the carry-in is zero and the least significant bits of the operands are the same or the carry-in is one and the least significant bits of the operands are different, and
   for each pair of adjacent bit positions, the four included bits are consistent with complementarity.

4. A method of predicting whether or not the sum of two binary addends is to be zero, said method comprising the step of determining whether or not the following two conditions are met:
   a) for each pair of adjacent bit positions, the four included bits are consistent with complementarity,
   b) the least significant bits of the operands are the same.

5. A method as recited in claim 4 that further predicts a zero sum of said addends and a carry-in, said method predicting:
   a zero sum when the carry-in is zero and conditions a and b are met;
   a zero sum when the carry-in is one and condition a is met and condition b is not met; and
   a non-zero sum otherwise.

* * * * *

UNITED STATES PATENT AND TRADEMARK OFFICE
CERTIFICATE OF CORRECTION

PATENT NO.   : 5,604,689
DATED        : February 18, 1997
INVENTOR(S)  : Kenneth A. Dockser It is certified that error appears in the above-identified patent and that said Letters Patent is hereby corrected as shown below:

In the abstract, the twelfth line of text, between "one" and before "2", replace the period "." with a semicolon --:--.

Column 2, line 46, change "predication" to --prediction--.

Column 5, line 21, change "considerate" to --considered--.

Signed and Sealed this

Fifteenth Day of September, 1998

Attest:

BRUCE LEHMAN

*Attesting Officer*   *Commissioner of Patents and Trademarks*